(12) United States Patent
Monacelli et al.

(10) Patent No.: US 8,443,606 B2
(45) Date of Patent: May 21, 2013

(54) ENHANCED STEAM CYCLE UTILIZING A DUAL PRESSURE RECOVERY BOILER WITH REHEAT

(75) Inventors: John E. Monacelli, Uniontown, OH (US); Timothy E. Hicks, Orrville, OH (US); Larry A. Hiner, Orrville, OH (US); Steven L. Osborne, Canal Fulton, OH (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 1196 days.

(21) Appl. No.: 12/055,832

(22) Filed: Mar. 26, 2008

(65) Prior Publication Data

US 2009/0241860 A1    Oct. 1, 2009

(51) Int. Cl.
F01K 13/00 (2006.01)
F01K 7/22 (2006.01)
F01K 7/34 (2006.01)
F22G 5/00 (2006.01)

(52) U.S. Cl.
USPC ............. 60/676; 60/653; 60/677; 60/679; 122/479.6

(58) Field of Classification Search
USPC ........... 60/645, 647, 648, 653, 670, 676–679; 122/7 R, 406.1, 459, 460, 479.6
See application file for complete search history.

(56) References Cited

U.S. PATENT DOCUMENTS

| | | | | |
|---|---|---|---|---|
| 2,997,032 A * | 8/1961 | Wedel | ............................. | 122/33 |
| 3,016,712 A * | 1/1962 | Taylor | ............................. | 60/676 |
| 3,135,246 A * | 6/1964 | Kochey, Jr. | ................ | 122/240.2 |
| 3,314,231 A * | 4/1967 | Hochmuth | ................ | 60/39.181 |
| 3,884,193 A * | 5/1975 | Bryers | ............................ | 122/4 D |
| 5,570,578 A * | 11/1996 | Saujet et al. | .................... | 60/647 |
| 5,603,803 A * | 2/1997 | Raak | ............................... | 162/31 |
| 5,701,829 A * | 12/1997 | Raak | ............................. | 110/238 |
| 5,784,888 A | 7/1998 | Termuehlen | | |
| 6,047,548 A * | 4/2000 | Bruckner et al. | .............. | 60/677 |
| 6,233,940 B1 | 5/2001 | Uji | | |
| 6,820,428 B2 * | 11/2004 | Wylie | .............................. | 60/772 |
| 7,243,619 B2 * | 7/2007 | Graves et al. | .............. | 122/479.6 |

(Continued)

FOREIGN PATENT DOCUMENTS

| | | |
|---|---|---|
| BE | 522339 | 9/1953 |
| DE | 1289938 | 2/1969 |

(Continued)

OTHER PUBLICATIONS

Raukola, et al., "Increasing Power Generation with Black Liquor Recovery Boiler," TAPPI Fall Conference & Trade Fair, 2002.

(Continued)

Primary Examiner — Kenneth Bomberg
Assistant Examiner — Christopher Jetton
(74) Attorney, Agent, or Firm — Eric Marich

(57) ABSTRACT

An enhanced steam cycle utilizing a dual pressure recovery boiler with reheat. A dual pressure designed recovery boiler furnace is provided with a lower furnace and an upper furnace. The lower furnace is operated at a lower temperature to prevent or reduce corrosion of the lower furnace wall tubes. The lower furnace can be either a low pressure natural circulation steam generating (drum) system or economizer. The upper furnace operates as a high pressure natural circulation steam generating (drum) system, or as a once-through supercritical steam generating system at higher temperatures and pressures permitting implementation of higher efficiency reheat steam cycles.

30 Claims, 13 Drawing Sheets

U.S. PATENT DOCUMENTS

| | | | |
|---|---|---|---|
| 2005/0252458 A1 | 11/2005 | Saviharju et al. | |
| 2006/0081199 A1* | 4/2006 | Graves et al. | 122/70 |
| 2006/0236696 A1* | 10/2006 | Saviharju et al. | 60/643 |

FOREIGN PATENT DOCUMENTS

| | | |
|---|---|---|
| DE | 1289938 B * | 2/1969 |
| DE | 19619470 | 9/1997 |
| ES | 2123358 | 1/1999 |
| UA | 54683 C2 | 2/2003 |
| WO | 2007083478 | 7/2007 |

OTHER PUBLICATIONS

Extended European Search Report by the European Patent Office dated Feb. 7, 2012; Reference P036532EP DJM; Application No./Patent No. 09156249.6-2321; Applicant/Propietor Babcock & Wilcox Power Generation Group, Inc.

Second Examiner's Report from Chilean Patent Office 694-09; Chilean Patent Application No. 694-09; Applicant Babcock & Wilcox Power Generation Group, Inc.

* cited by examiner

ENHANCED STEAM CYCLE UTILIZING A DUAL PRESSURE RECOVERY BOILER WITH REHEAT

FIELD AND BACKGROUND OF THE INVENTION

1. Field of the Invention

The present invention relates to the field of power generation and industrial boiler design, including Kraft process recovery boilers or soda process recovery boilers used in the pulp and paper industry. In particular, the present invention provides a new and useful dual pressure recovery boiler installation which employs an enhanced steam cycle with reheat to achieve a large increase in electrical generation with various turbine cycles while overcoming traditional lower furnace material limitations.

2. Description of the Related Art

The recovery boiler is utilized by the pulp and paper industry to provide a means for recovery of certain chemicals created as part of the pulping and papermaking process, electrical generation through a steam turbine, and production of process steam used by the mill in the pulping and papermaking process.

For a general discussion of chemical and heat recovery in the pulp and paper industry, and the particular aspects of the alkaline pulping and chemical recovery process, reference is made to *Steam/its generation and use,* 41$^{st}$ Ed., Kitto and Stultz, Eds., Copyright© 2005, The Babcock & Wilcox Company, Chapter 28.

Referring to the drawings of the present application, FIG. 1 is sectional side view of a known Kraft recovery boiler manufactured by The Babcock & Wilcox Company. The two main functions of a Kraft process recovery boiler, soda process recovery boiler, or simply, "recovery boiler", are to burn the organic portion of black liquor (a by-product of chemical pulping) to release energy for generating steam and to reduce the oxidized inorganic portion of black liquor in a pile, or bed, supported by the furnace floor. The molten inorganic chemicals in the bed, known as smelt, are discharged to a tank of water where they are dissolved and recovered as green liquor.

The recovery boiler illustrated in FIG. 1 comprises a furnace 10 which is typically rectangular in cross-section, having enclosure walls 12 formed of water or steam-cooled tubes. The black liquor is fed into a lower portion of the furnace 10 through one or more black liquor spray nozzles 14 which spray the black liquor into the furnace 10 through openings in the enclosure walls 12. The furnace 10 is generally rectangular in cross-section, and has a front wall 16, a rear wall 18 and two side walls 20. Combustion air is introduced into the recovery boiler furnace 10 via air ports at staged elevations above a floor 22 of the furnace 10. These elevations are—primary air 24, secondary air 26, and tertiary air 28, as shown in FIG. 1. The gases generated by combustion rise out of the furnace 10 and flow across convection heat transfer surfaces. Superheater (SH) surface 30 is arranged at the entrance to the convection pass, followed by steam generating (Boiler Bank) surface 32 and finally economizer (EC) surface 34. A furnace arch or nose 37 uniformly distributes the gas flow entering the superheater surface 30.

The potential for corrosion in the lower furnace of recovery boilers is a significant issue. As is known to those skilled in the art, recovery boilers operate with the lower furnace in a reducing atmosphere (reduced oxygen) environment. The tubes forming the lower furnace water-cooled enclosure walls 12 which are exposed to this reducing atmosphere experience extremely accelerated corrosion rates. As a result, the lower furnace enclosure walls 12 must have additional protection from corrosion.

Early designs to enhance corrosion resistance employed cylindrical pin studs welded to the tubes in the reducing zone of the lower furnace. The pin studs held solidified smelt, forming a barrier to the corrosive furnace environment. The traditional pin stud arrangement later evolved into the use of composite or bimetallic tubes, as the design pressure of recovery boilers increased to above 900 psig. The composite tubes are comprised of an outer protective layer of AISI 304L stainless steel and an inner core layer of standard American Society for Testing and Materials (ASTM) A 210 Grade A1 carbon steel. The composite tube inner and outer components are metallurgically bonded. The outer layer of austenitic stainless steel, which is also used to cover the furnace side of the carbon steel membrane bar, protects the core carbon steel material from furnace corrosion. Other methods used for lower furnace corrosion protection include: chromized carbon steel tubes, chromized pin studs, carbon steel pin studs, metallic spray coatings, high density pin studs, 304L, Alloy 825 and Alloy 625 composite tubes, and weld overlay of carbon steel tubes. All these approaches are extremely expensive.

A recent solution to the problem of lower furnace corrosion is disclosed in U.S. Pat. No. 7,243,619 to Graves et al., which provides a dual pressure boiler system having a furnace that is divided into two sections—a bottom low pressure furnace and a top high pressure furnace. The bottom furnace operates as a separate low pressure natural circulation steam generating system. The top furnace operates as a high pressure natural circulation steam generating system. Since the water tubes in the bottom furnace operate at lower temperatures and lower pressures, they are less susceptible to corrosion.

FIG. 1A of the present disclosure is a schematic diagram of this dual pressure recovery boiler, generally designated 100. The low pressure bottom section 110 and the high pressure top section 110' form separate natural circulation systems. Each section 110, 110' has its own dedicated steam drum 112, 112' for separating saturated steam from water, pump 114, 114' for pumping feed water to the steam drum 112, 112', and superheater 120, 120' for increasing the temperature of the saturated steam which exits the steam drum 112, 112'. Tubing 118 routes the saturated steam to the low pressure superheater 120, and then to a plant steam header 122. The separated water from the low pressure steam drum 112 flows in piping 128 into the low pressure bottom section 110 of the boiler 100. The water enters into and circulates in furnace wall tubes forming section 110 and then re-enters the low pressure steam drum 112 as a steam-water mixture. The natural circulation system in the high pressure top section 110' operates similarly but at higher temperatures and pressures. The pump 114' feeds water to heat exchanger or economizer 117 which is fluidically connected downstream from the pump 114' before the high pressure steam drum 112'. The economizer 117, in turn, discharges the water to the high pressure steam drum 112'. Steam is separated from the circulating water and routed via tubing 118' to the high pressure superheater 120'. From the high pressure superheater 120', the steam flows to turbine/generator 124 to produce electricity. Water from the high pressure steam drum 112' flows in piping 128' into the high pressure top section 110', circulates through the upper furnace walls of top section 110' and the water-steam mixture is conveyed to the high pressure steam drum 112'.

Pulp and paper mills are constantly seeking ways to increase the power output and efficiency of steam generators. Raukola et al., in a technical paper titled "Increasing Power Generation with Black Liquor Recovery Boiler" presented at the 2002 TAPPI Fall Conference & Trade Fair, describe several approaches. These include: increased dry solids content of the black liquor to increase boiler efficiency; air preheating with extraction steam from the steam turbine; taking sootblowing steam from extraction steam from the steam turbine, rather than from after the primary superheater, in order to extract more useful work from the steam; in back-pressure steam turbine installations, not throttling the back-pressure steam in order to increase feedwater temperature; employing high-pressure feed water preheaters using extraction steam from the steam turbine; increasing main steam temperature and pressure (noting, however, that corrosion of the furnace walls and in the superheater area are the biggest concerns related to this approach); providing a reheater arrangement where the main steam, after expanding through the turbine, is sent back to the boiler to be superheated again before the next turbine stage; employing a condensing steam turbine instead of a back-pressure steam turbine; and employing heat recovery after the electrostatic precipitator to replace back-pressure steam used normally for preheating and thus releases steam to be used for power generation with the condensing turbine.

U.S. Patent Application Publication US 2006/0236696 A1 to Saviharju et al. discloses a spent liquor recovery boiler which is provided with a reheater for reheating steam from the high-pressure part of the turbine. The recovery boiler has a conventional furnace with the exception of the provision of at least one cavity preferably located at an upper portion of the recovery boiler furnace front wall. The reheater has a first part and a second part, the first part being located in the stream of flue gas between the superheater and a boiler bank, with the second part of the reheater being located within the cavity. The cavity may also include a superheater section. Flue gases formed in the cavity enter the furnace after passing across the second reheater part and superheater section.

U.S. Pat. No. 5,603,803 to Raak discloses a method and apparatus for recovering heat in a soda liquor recovery boiler. The boiler walls are formed of water-cooled tubes connected to the water/steam circulation system of the boiler. The lower section of the boiler is defined by water tubes connected to a separate water circulation system of a forced, rather than natural circulation, type, and has a lower pressure than that of the actual boiler. The cooling circulation in the lower section of the furnace is arranged by using a separate water circulation system. The heat recovered to a separate water circulation system may be used, e.g., for heating the boiler feed water, e.g., in a separate heat exchanger, which is connected with the water circulation system by a separate cooling circulation system, whereby the heat released from the cooling of the lower section of the furnace is recovered. Thereby, it is possible to maintain the temperature of the medium flowing in the lower section of the separately cooled furnace nearly constant by regulating the cooling effect of the heat exchanger in the cooling circulation system. The temperature of the cooling medium flowing in the cooling circulation system of the boiler according to the invention is preferably regulated so that it causes the thermal expansion of the separately cooled lower section of the furnace to correlate with the thermal expansion of the walls within the boiler water/steam circulation systems, i.e., no sealing problems exist between the separately cooled lower section and the other furnace structure and no gas or chemical leakages occur between the parts.

FIG. 2 is a schematic illustration of a known pulp mill recovery boiler and steam turbine installation employing a conventional superheat (SH) cycle, and generally referred to as 200. Temperatures (degrees F.), pressures (pounds per square inch gage or absolute—psig, psia) and flow rates (thousands of pounds per hour—kpph) are provided merely for illustrative purposes. As illustrated therein, recovery boiler 202 comprises a furnace 210 having enclosure walls 212 formed of fluid-cooled tubes which generally contain a water-steam mixture. The black liquor is fed into a lower portion of the furnace 210 and combusted with air. The gases generated by combustion rise out of the furnace 210 and flow across convection heat transfer surfaces, and which include superheater (SH) surface 230 and economizer (EC) surface 234. The water-cooled furnace enclosure walls 212 cool the combustion gases and generate a steam-water mixture therein. A furnace arch or nose 237 uniformly distributes the gas flow entering the superheater surface 230.

Feedwater pump 236 provides feedwater to the economizer 234 via line 238. Flue gases from combustion of the black liquor pass across the economizer 234, preheating the incoming feedwater which is conveyed via line 240 to steam drum 242. The hot combustion flue gases transfer heat to the enclosure walls 212, generating a water-steam mixture therein which is also conveyed upwardly therethrough to the steam drum 242 via risers 244. Separation devices (not shown) within the steam drum 242 separate the water from the water-steam mixture. The feedwater mixes in the steam drum 242 with the separated water and then this mixture is conveyed to the lower portion of the furnace 210 via downcomers 246. Saturated connections 248 convey the steam from the steam drum 242 to the superheater 230, where the steam is superheated. The superheated steam is then conveyed via line 250 to steam turbine 252 which is advantageously connected to an electric generator (not shown) for producing electricity. The superheated steam expands through the turbine 252, causing the turbine rotors to spin, thereby causing the electric generator connected thereto (not shown) to generate electricity. A portion of the steam is conveyed via line 254 to a condenser 256. The majority of the steam exiting from the turbine 252 is extraction steam used to supply various plant process requirements. For example, line 258 conveys 150 psia process steam to header 260 and this steam is then conveyed via one or more lines 262 to various plant processes. Similarly, line 264 conveys 75 psia process steam to header 266 and this steam is then conveyed to one or more lines 268 to other various plant processes. Condensate from condenser 256 is then conveyed via line 270 to deaerator 272 which, in turn, provides the condensate via line 274 to feedwater pump 236, completing the fluid cycle.

Recovery boilers with reheat steam turbine cycles are known, as disclosed by Saviharju et al. However, that design still deals with the lower furnace corrosion concerns of the prior art in conventional fashion; i.e., the steam pressure in the furnace walls low enough such that excessive corrosion does not take place in the water-cooled tube walls of the furnace. The saturation temperature in the water-steam emulsion plus the temperature difference due to incoming heat flux from the tube surface into water is less than 400-500 C. (752 F.-932 F.), typically less than 400 C. (752 F.), which is the tube surface temperature. Raak discloses a soda liquor recovery boiler where a lower section of the boiler has a lower pressure than that of the actual boiler and is defined by water tubes connected to a separate water circulation system of a forced, rather than natural circulation, type. Heat may be recovered for preheating the boiler feed water or combustion air, in the separate water circulation system; however, the separate water circulation system is not in communication with the water/steam circulation system, and the purpose of the construction is not to provide increased electrical generation capacity but rather to maintain the temperature of the medium flowing in the lower section of the separately cooled furnace nearly constant by regulating the cooling effect of the heat exchanger in the cooling circulation system to address thermal expansion concerns that might cause sealing problems between the separately cooled lower section of the furnace to correlate with the thermal expansion of the walls within the boiler water/steam circulation systems. Graves et al. provides a solution to the problem of lower furnace corrosion by providing a dual pressure boiler system having a furnace that is divided into two sections—a bottom low pressure furnace and a top high pressure furnace. However, Graves et al. does not teach or suggest any way to enhance the electrical generating capability of the overall plant. The superheated steam from the high pressure superheater is routed to a turbine generator for producing electricity. The superheated steam from the low pressure superheater is piped to a plant steam header for use as process steam.

It is apparent that an improved recovery boiler design which provides increased operating efficiency and electrical generation output while reducing the potential for lower furnace corrosion would be welcomed by the industry.

SUMMARY OF THE INVENTION

The present invention takes advantage of the flexibility of the dual pressure recovery boiler furnace construction and allows the use of an enhanced steam cycle utilizing a dual pressure recovery boiler with reheat to achieve a large increase in electrical generation with various turbine cycles while overcoming traditional lower furnace material limitations. The present invention is able to provide steam to two separate turbine stages, one high pressure and the other low pressure, off of two different steam flows at different pressures, emanating from the dual pressure recovery boiler.

A dual pressure designed recovery boiler furnace is provided with a lower furnace and an upper furnace. The lower furnace is operated at a lower temperature to prevent or reduce corrosion of the lower furnace wall tubes caused by the reducing environment. The lower furnace can be either a low pressure natural circulation steam generating (drum) system or economizer. Unlike the lower furnace, the upper furnace is not exposed to a reducing environment and is therefore not as susceptible to severe corrosion rates. The upper furnace is operated at higher temperatures and pressures which permit implementation of higher efficiency reheat steam cycles. The upper furnace thus operates as a high pressure natural circulation steam generating (drum) system. The dual pressure recovery boiler can thus be coupled to a variety of condensing, non-condensing or a combination of condensing and non-condensing turbine cycles to provide a large increase in electrical generation. As used in the present disclosure, natural circulation also includes pump-assisted natural circulation designs.

The lower furnace, with a drum natural circulating design, can be used to provide steam which is combined with the exhaust from a high pressure steam turbine and routed to a reheater for reheating, and thence to a low pressure turbine. The lower furnace may provide steam to preheat the feedwater which is later conveyed to the high pressure section of the boiler. Still further, the lower furnace may provide process steam to the mill, while the upper furnace produces steam which is expanded through high pressure and low pressure steam turbine stages. Also, the lower furnace may provide steam to a low pressure steam turbine, while the upper furnace produces steam which is expanded through high pressure and low pressure steam turbine stages. Alternatively, the lower furnace can be part of the circuitry used to preheat incoming feedwater which is then further heated in the convection banks of the economizer.

The top furnace typically operates at a pressure of about 2800 psig or less if it is a natural circulation design, while the bottom furnace operates at a pressure of about 900 psig or less. The low pressure steam turbine(s) may be a condensing steam turbine. The high pressure steam turbine may be a non-condensing steam turbine. Advantageously, the low pressure steam can be used to heat the feedwater.

If additional electrical generation efficiency is required, the top furnace may alternatively operate as a once-through or supercritical furnace. Top furnace operating pressures may be in the supercritical range, i.e., in excess of 3206 psia; in any event the top furnace operating pressure would be selected to be able to provide steam at a desired steam turbine throttle inlet condition, say 3600 psig, plus the pressure drop in the steam piping, superheater, furnace walls and economizer and feedwater inlet piping back to the feed water pump(s).

The various features of novelty which characterize the invention are pointed out with particularity in the claims annexed to and forming a part of this disclosure. For a better understanding of the invention, its operating advantages and the specific benefits attained by its uses, reference is made to the accompanying drawings and descriptive matter in which preferred embodiments of the invention are illustrated.

DESCRIPTION OF THE PREFERRED EMBODIMENTS

Reheat cycles used in the utility industry operate at much higher pressures and tube temperatures than conventional (state of the art) recovery boilers. The problem in utilizing such higher reheat cycles in recovery boiler applications is that operating a conventional recovery boiler furnace at elevated pressures (and, thus, at higher tube wall temperatures due to the higher saturation temperatures within the furnace wall tubes) means that excessive corrosion rates will normally be experienced in the furnace.

The present invention overcomes this difficulty by providing a dual pressure recovery boiler having a furnace that is divided into two sections—a bottom low pressure furnace and a top high pressure furnace, in a reheat steam turbine cycle arrangement, and coupling the steam produced in these separate sections to the steam turbine cycle in a new manner. The lower furnace, which is exposed to a reducing atmosphere (reduced oxygen) environment, is operated at a lower temperature (i.e., the lower furnace wall tubes operate at a lower tube wall metal temperature) to prevent or reduce corrosion of the lower furnace wall tubes caused by the reducing environment. The lower furnace can be either a low pressure natural circulation steam generating (drum) system or an economizer. The upper furnace, which is not exposed to the reducing environment and is therefore not as susceptible to severe corrosion rates, is operated at higher temperatures (i.e., the upper furnace wall tubes operate at a higher tube wall metal temperature) and pressures which permits the implementation of higher efficiency reheat steam cycles. More particularly, the steam that is produced from the low pressure natural circulation steam generation system can be used in the following applications within the process:

Steam can be combined with the high pressure turbine exhaust at the reheat superheater inlet;

Steam can be used to heat feedwater for the high pressure furnace;

Steam can be superheated and fluidly connected to a separate low pressure steam turbine; and Steam can be separately heated and used as process steam in the pulp mill.

If desired, the lower furnace can be part of the economizer circuit to directly heat feedwater.

Figure 1:
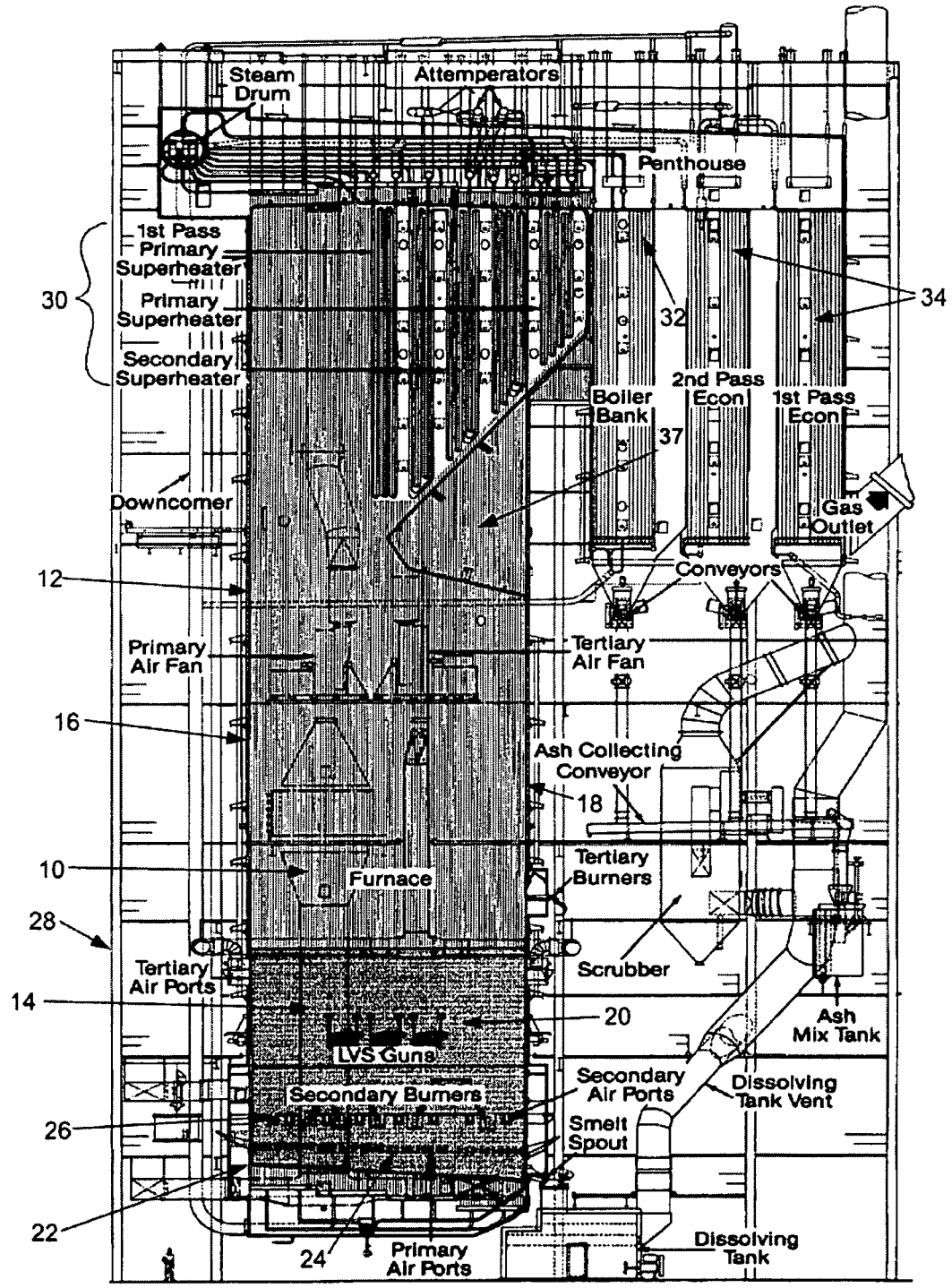
FIG. 1 is sectional side view of an elevation of a known Kraft recovery type boiler manufactured by The Babcock & Wilcox Company.
Figure 1A:
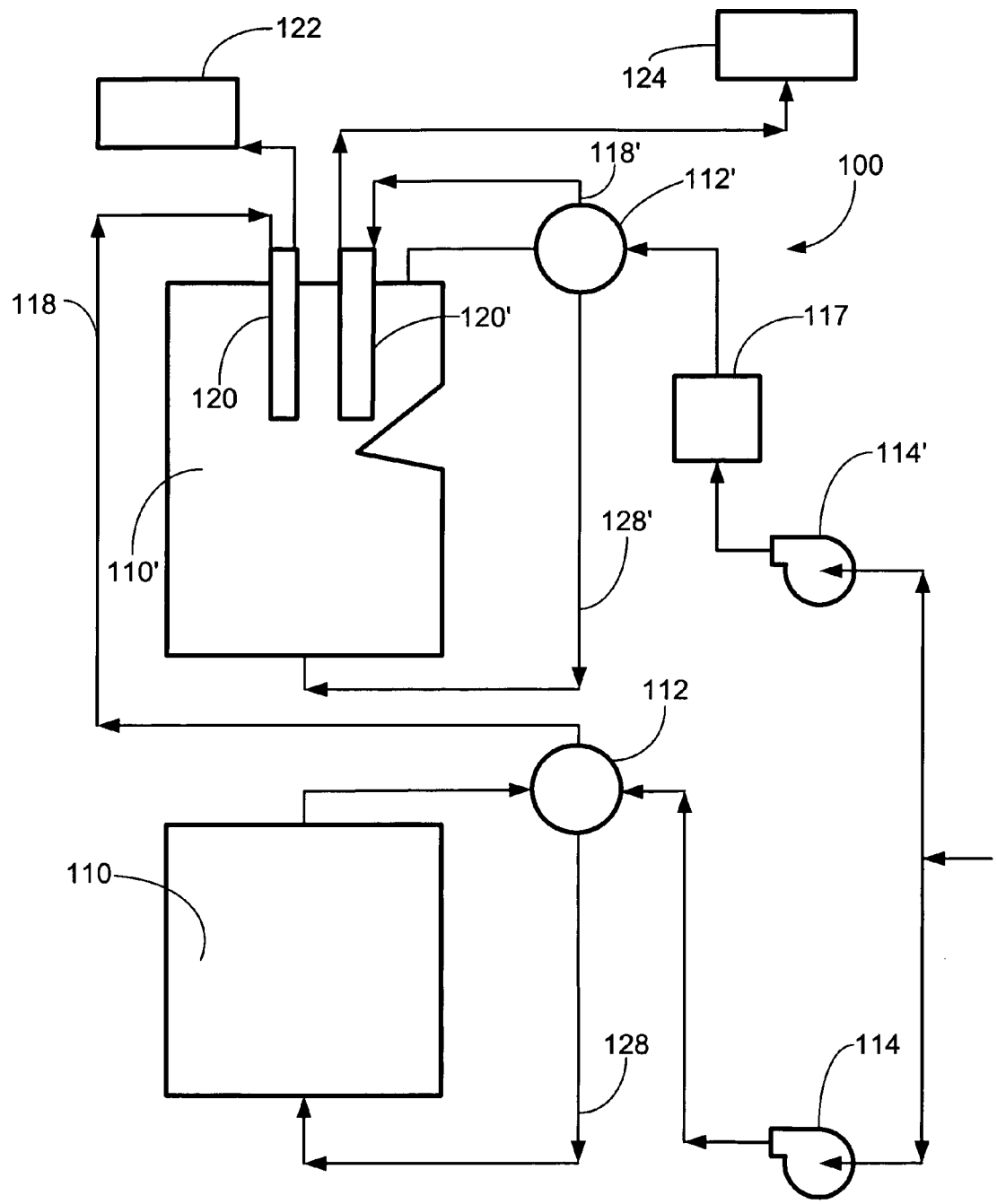
FIG. 1A is a schematic diagram of a known dual pressure recovery boiler.
Figure 2:
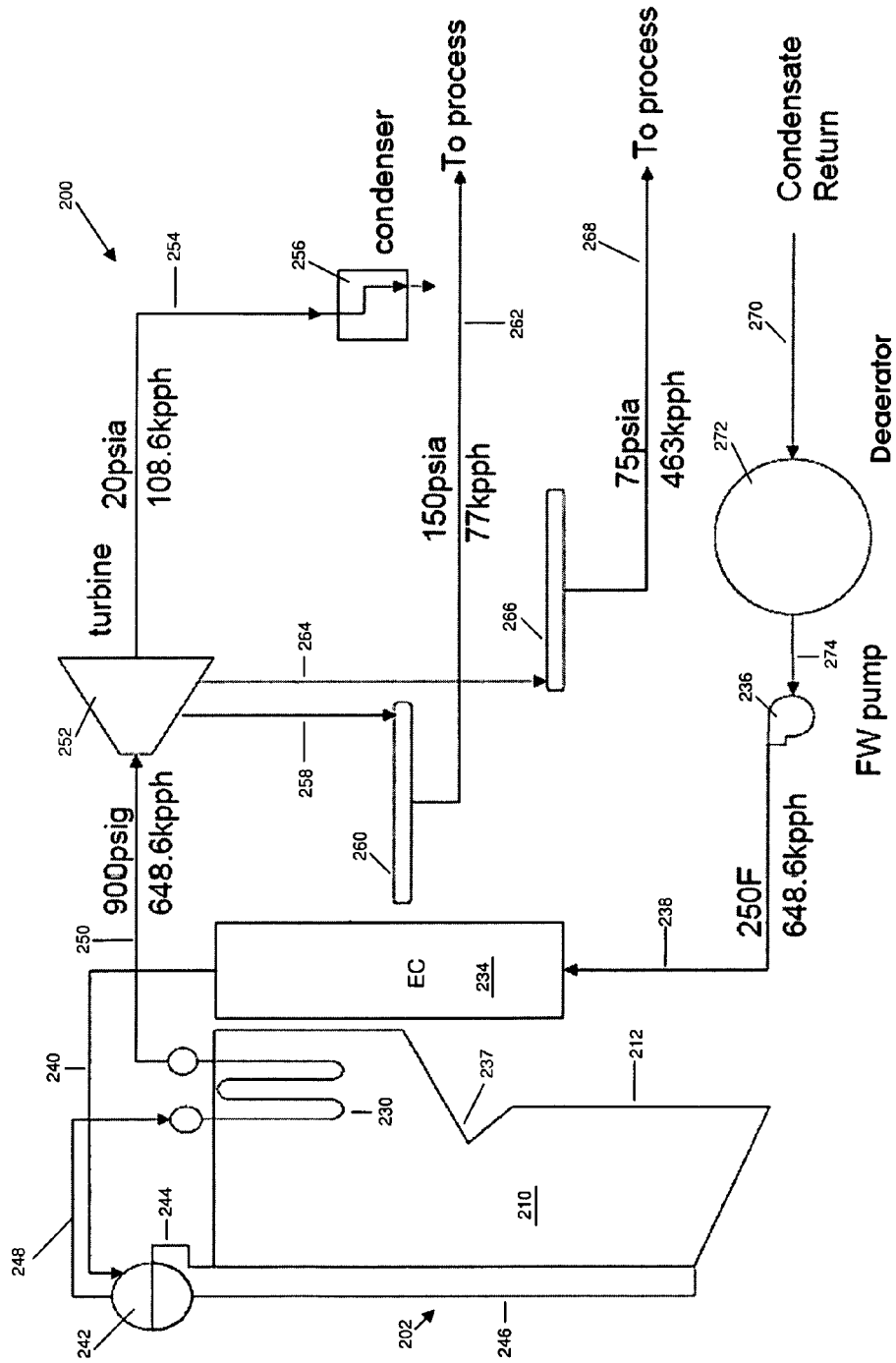
FIG. 2 is a schematic illustration of a known pulp mill recovery boiler and steam turbine installation employing a conventional superheat (SH) cycle.
Figure 3:
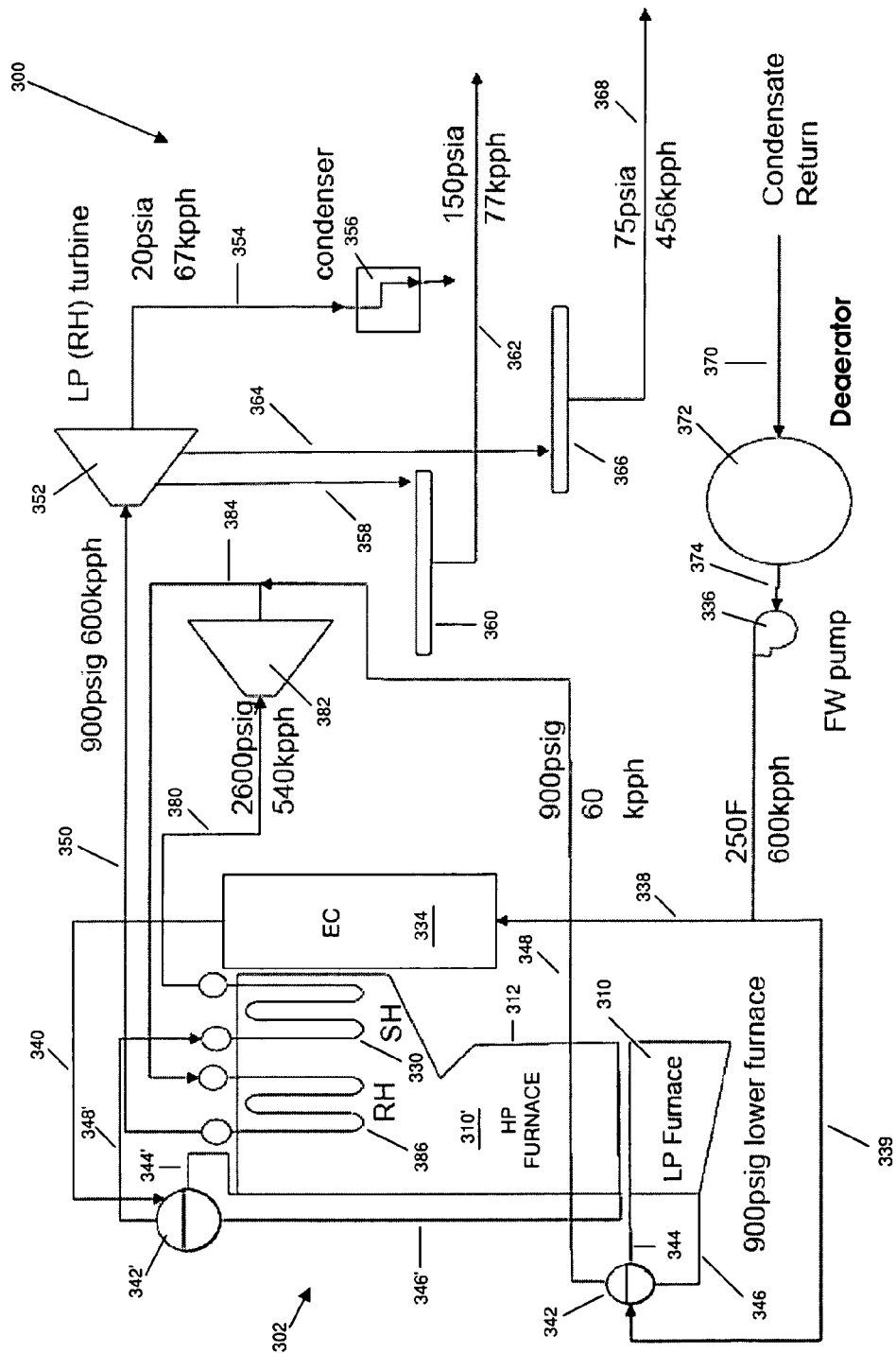
FIG. 3 is a schematic illustration of a first embodiment of the present invention, comprising a dual pressure recovery boiler employed as part of a reheat steam cycle steam turbine installation, and wherein low pressure (LP) steam is mixed with high pressure (HP) steam turbine exhaust and then reheated.

Referring to the drawings generally, wherein like reference numerals designate the same or functionally similar elements throughout the several drawings, and to FIG. 3 in particular, there is shown a schematic illustration of a first embodiment of the present invention, comprising a dual pressure recovery boiler employed as part of a reheat steam cycle steam turbine installation, generally referred to as 300. In this embodiment, low pressure (LP) steam is mixed with high pressure (HP) steam turbine exhaust and then reheated. In this and the following Figs., and solely for the sake of convenience to the reader, the "200" series of reference numerals refer to elements in FIG. 2, while the "300" series of reference numerals refer to elements in FIG. 3, etc. Similarly, the last two numbers in the various reference numerals designate the same or functionally similar elements throughout the several drawings; e.g., 234, 334, 434 etc. refers to the economizer in FIGS. 2, 3 and 4 etc. Also, temperatures (degrees F.), pressures (pounds per square inch gage or absolute—psig, psia) and flow rates (thousands of pounds per hour—kpph) are provided merely for illustrative purposes and are not intended to limit the scope of the present invention.

The dual pressure recovery boiler 302 has a low pressure (LP) natural circulation bottom section 310 and a high pressure (HP) natural circulation top section 310'. The LP bottom section 310 and the HP top section 310' form separate natural circulation systems. Each section 310, 310' has its own dedicated water-steam separation device (vertical separator or the like) or steam drum 342, 342' for separating saturated steam from water. Feedwater (FW) pump 336 provides feed water to the steam drum 342, 342' in each circuit. In this and succeeding Figs., while a single FW pump 336 is shown in the Figs., this is for the sake of convenience. Since the LP bottom furnace and HP top furnace operate at different pressures, actual applications will likely employ separate FW pumps to supply the feedwater at the pressure required for each furnace, rather than providing a FW pump capable of the higher pressure required by the HP top furnace and then throttling the pressure through a valve to the lower pressure required by the LP furnace. This also permits the design pressure for the lower furnace components to be based upon the lower pressure FW pump ratings, rather than that of a higher pressure FW pump.

The LP steam drum 342 operates at a pressure of typically about six hundred to nine hundred psig; in any event, at a pressure where the LP bottom section 310 furnace tube wall metal temperature will be low enough to resist corrosion in the reducing atmosphere environment. Feedwater is conveyed via line 339 to the LP steam drum 342, where it is mixed with water separated from the water-steam mixture produced in the walls of the LP furnace 310. This mixture is then conveyed to the lower portion of the LP furnace 310 via downcomers 346. The water-steam mixture produced in the walls of the LP furnace 310 is then conveyed upwardly therethrough to the LP steam drum 342 via risers 344. Separation devices (not shown) within the LP steam drum 342 separate the water from the water-steam mixture.

The HP top section 310' is operated similarly but at higher temperatures and pressures. Typical operating pressure in the HP steam drum 342' is about 2800 psig or less; in any event, the operating pressure is selected to be able to provide steam at a desired turbine throttle inlet condition, allowing for the pressure drop in the steam piping, superheater and saturated connections back to the HP steam drum 342'. Feedwater (FW) pump 336 again provides feed water to the steam drum 342, 342' in each circuit as before. In this case, the feedwater is conveyed via line 338 to economizer 334 for preheating. EC 334 is fluidically connected downstream of FW pump 336 and upstream of the HP steam drum 342'. The EC 334 discharges the heated feedwater via line 340 to the HP steam drum 342'. The water-steam mixture produced in the walls of the HP furnace 310' is conveyed upwardly therethrough to the HP steam drum 342' via risers 344'. Separation devices (not shown) within the HP steam drum 342' separate the water from the water-steam mixture, and the separated water and feedwater mix together and are conveyed via downcomers 346' to the enclosure walls 312 in the lower portion of the HP furnace 310'. Steam separated from the circulating water is routed via saturated connections 348' to the superheater SH 330.

The temperatures (degrees F.), pressures (pounds per square inch gage or absolute—psig, psia) and flow rates (thousands of pounds per hour—kpph) are provided merely for illustrative purposes and are not intended to limit the scope of the invention. As illustrated therein, recovery boiler 302 comprises a dual pressure furnace having a LP section 310 and a high pressure section 310'. Black liquor combusted within the recovery boiler 302 furnace generates hot gases which flow across the heat transfer surfaces. In this embodiment, reheat or reheater (RH) surface 386 is provided, in addition to (now) high pressure superheater (HPSH) surface 330 and high pressure economizer (HPEC) surface 334 via line 380.

Feedwater pump 336 provides feedwater to HPEC 334, which is now part of the HP furnace 310' circuit, via line 338, and also to the lower LP furnace 310 via line 339. HP steam from the HP steam drum 342' is conveyed via high pressure saturated connections 348' to HPSH 330. In order to take advantage of the HP superheated steam, a HP steam turbine stage 382 is provided and receives the HP steam from HPSH 330.

The HP steam turbine stage 382 may be provided as a separate steam turbine connected to a separate electric generator (not shown), or it may be may be provided as an additional stage provided upstream of a new or existing LP steam turbine 352, or it may be provided as another steam turbine coupled to an existing LP steam turbine-generator. For the sake of conciseness, the term HP steam turbine 382 will be used to encompass all such variations.

The HP steam from the HPSH 330 expands through the HP steam turbine 382. LP steam from the LP steam drum 342 is advantageously conveyed via line 348 and combined with the HP steam turbine 382 exhaust. This steam flow is, in turn, conveyed via line 384 to the inlet of RH 386 for reheating. RH 386 may be counterflow or parallel flow with respect to the flow of combustion gases there across, as required. The reheated steam is then conveyed via line 350 from the outlet of RH 386 to the LP steam turbine 352 and associated electric generator (not shown). Some of the steam exhausted from the LP steam turbine 352 is conveyed via line 354 to a condenser 356. The majority of the steam exiting from the turbine 352 is extraction steam used to supply various plant process requirements. For example, line 358 conveys 150 psia process steam to header 360 and this steam is then conveyed via one or more lines 362 to various plant processes. Similarly, line 364 conveys 75 psia process steam to header 366 and this steam is then conveyed to one or more lines 368 to other various plant processes. The remainder of the steam is conveyed via line 354 to the condenser 356. Condensate from condenser 356, as well as from the various plant processes supplied by lines 362 and 368, is then conveyed via line 370 to deaerator 372 which, in turn, provides the condensate via line 374 to feedwater pump 336, completing the fluid cycle.

Certain similarities between the embodiment of FIG. 3 and those illustrated and described in later Figs., as well as the additional advantages obtained thereby, will thus become apparent.

Figure 4:
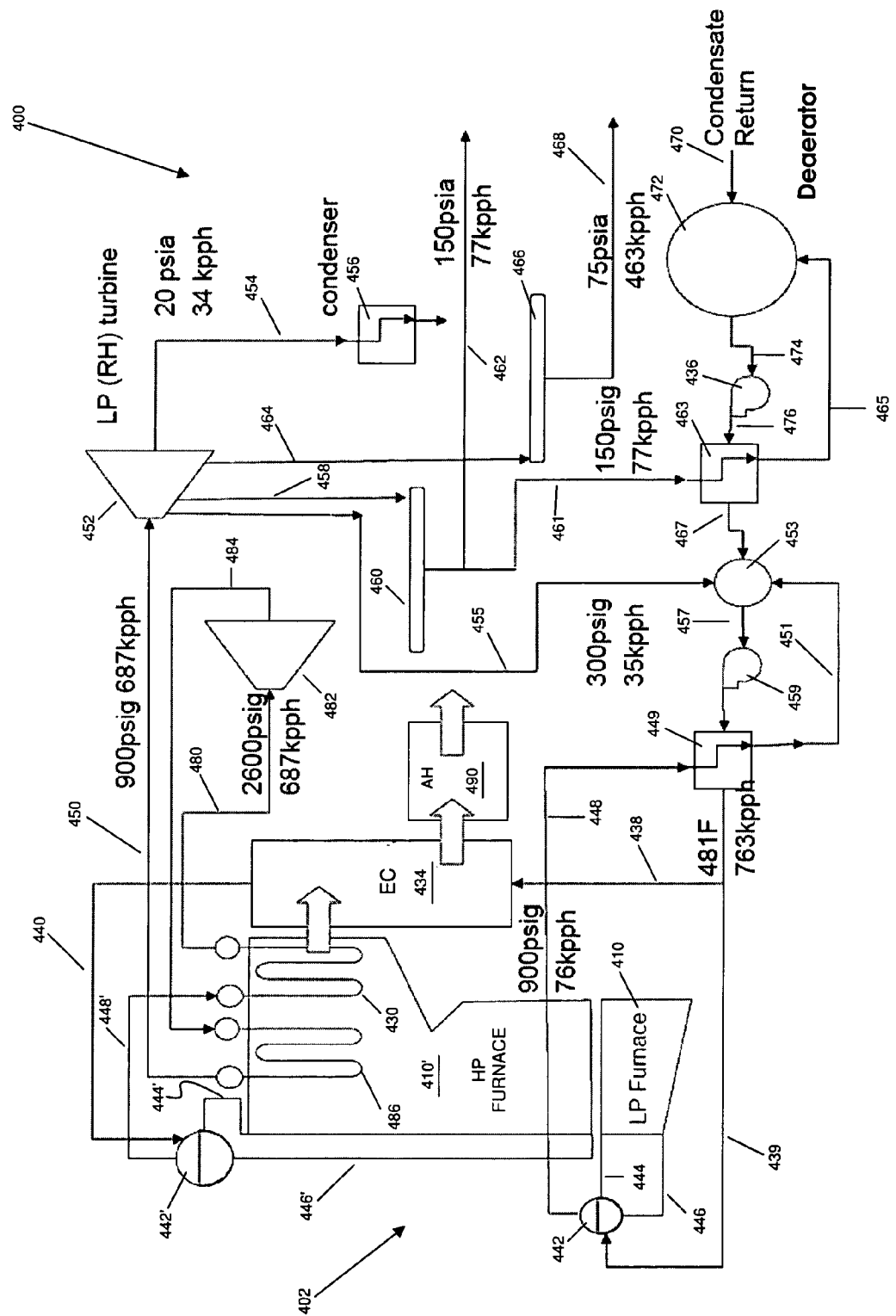
FIG. 4 is a schematic illustration of a second embodiment of the present invention, comprising a dual pressure recovery boiler employed as part of a reheat steam cycle steam turbine installation, and wherein low pressure (LP) steam is used for feed water heating.

FIG. 4 is a schematic illustration of a second embodiment of the present invention, comprising a dual pressure recovery boiler employed as part of a reheat steam cycle steam turbine installation, generally referred to as 400. Here, low pressure (LP) steam is used for feed water heating.

As illustrated therein, recovery boiler 402 comprises a dual pressure furnace having a LP section 410 and a high pressure section 410'. Black liquor combusted within the recovery boiler 402 furnace generates hot gases which flow across the heat transfer surfaces. In this embodiment, RH surface 486 is provided, in addition to high pressure superheater (HPSH) surface 430 and high pressure economizer (HPEC) surface 434.

Feedwater pumps 436 and 459 provide feedwater via line 438 to HPEC 434, and then via line 440 to HP steam drum 442' which is part of the HP furnace 410' circuit, and also to the lower LP furnace 410 via line 439. HP steam from the HP steam drum 442' is conveyed via high pressure saturated connections 448' to HPSH 430. A HP steam turbine stage 482 is provided and receives the HP steam from HPSH 430 via line 480. Risers 444 and downcomers 446 fluidically interconnect the LP steam drum 442 and LP furnace 410, while risers 444' and downcomers 446' fluidically interconnect the HP steam drum 442' and HP furnace 410'.

The HP steam from the HPSH 430 is conveyed via line 480 to HP steam turbine 482 and expands through the HP steam turbine 482. The exhaust flow therefrom is conveyed to RH 486 via line 484. In this embodiment, LP steam from the LP steam drum 442 is advantageously conveyed via line 448 to a feedwater heater 449, provided downstream of the feedwater pump 459, and preheats the feedwater provided to EC 434 and to the lower LP furnace 410. This steam flow is, in turn, conveyed via line 451 to a direct contact feedwater heater 453 which also receives extraction steam via line 455 from the LP turbine 452. As before, reheated steam from RH 486 is conveyed via line 450 from the outlet of RH 486 to the LP steam turbine 452 and associated electric generator (not shown). Some of the steam exhausted from the LP steam turbine 452 is conveyed via line 454 to a condenser 456. The majority of the steam exiting from the turbine 452 is extraction steam used to supply various plant process requirements. For example, line 458 conveys 150 psia process steam to header 460 and this steam is then conveyed via one or more lines 462 to various plant processes. In this embodiment, process steam from header 460 is also conveyed via line 461 to another feedwater heater 463, which receives the feedwater from feedwater pump 436. This process steam flow is, in turn, conveyed via line 465 to deaerator 472 where it mixes with condensate return via line 470. Feedwater pump 436 thus receives fluid from deaerator 472 and conveys it via line 476 to feedwater heater 463, then via line 467 to direct contact feedwater heater 453, and then via line 457 to feedwater pump 459. Similarly, line 464 conveys 75 psia process steam to header 466 and this steam is then conveyed to one or more lines 468 to other various plant processes. Condensate from condenser 456, as well as from the various plant processes supplied by lines 462 and 468, is conveyed via line 470 to deaerator 472 which, in turn, provides the condensate via line 474 to feedwater pump 436, completing the fluid cycle.

Due to the increased feedwater temperatures the EC 434, the flue gases exiting from the recovery boiler 402 may be higher than desired. In such cases, an air heater 490, advantageously a tubular air heater 490, may be employed to extract additional heat from the flue gases to increase boiler efficiency.

Figure 5:
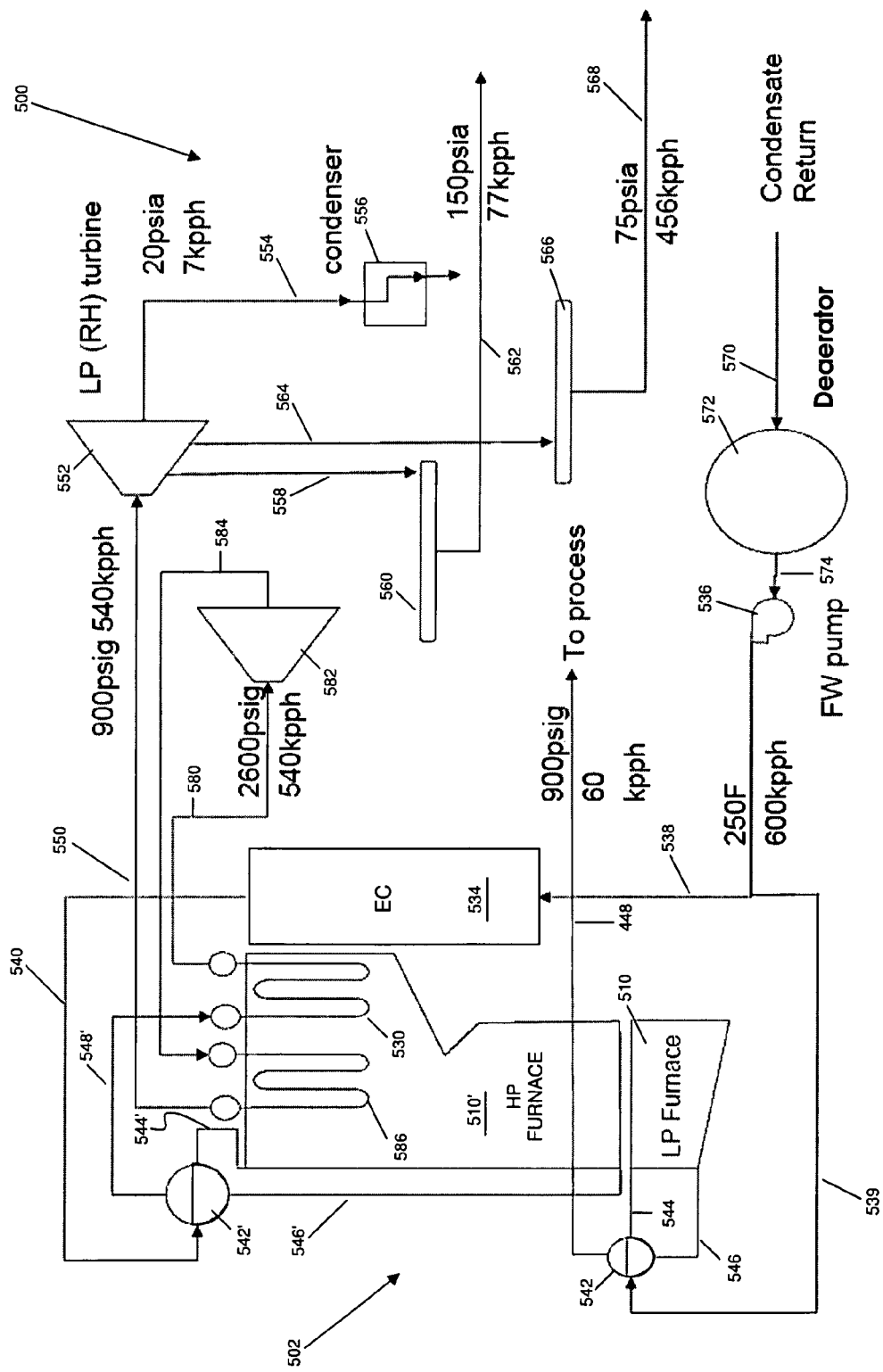
FIG. 5 is a schematic illustration of a third embodiment of the present invention, comprising a dual pressure recovery boiler employed as part of a reheat steam cycle steam turbine installation, and wherein low pressure (LP) steam is used for process steam.

FIG. 5 is a schematic illustration of a third embodiment of the present invention, comprising a dual pressure recovery boiler employed as part of a reheat steam cycle steam turbine installation, generally referred to as 500. In this case, low pressure (LP) steam is used for process steam.

As illustrated therein, recovery boiler 502 comprises a dual pressure furnace having a LP section 510 and a high pressure section 510'. Black liquor combusted within the recovery boiler 502 furnace generates hot gases which flow across the heat transfer surfaces. In this embodiment, RH surface 586 is provided, in addition to high pressure superheater (HPSH) surface 530 and high pressure economizer (HPEC) surface 534.

Feedwater pump 536 provides feedwater to HPEC 534 via line 538 and then via line 540 to HP steam drum 542', which is part of the HP furnace 510' circuit, and also to the lower LP furnace 510 via line 539. HP steam from the HP steam drum 542' is conveyed via high pressure saturated connections 548' to HPSH 530. A HP steam turbine stage 582 is provided and receives the HP steam from HPSH 530 via line 580. Risers 544 and downcomers 546 fluidically interconnect the LP steam drum 542 and LP furnace 510, while risers 544' and downcomers 546' fluidically interconnect the HP steam drum 542' and HP furnace 510'.

The HP steam from the HPSH 530 is conveyed via line 580 to HP steam turbine 552 and expands through the HP steam turbine 582. The exhaust flow therefrom is conveyed to RH 586 via line 584. In this embodiment, LP steam from the LP steam drum 442 is advantageously conveyed via line 448 and used to supply various plant process steam requirements.

Reheated steam from RH 586 is conveyed via line 550 from the outlet of RH 586 to the LP steam turbine 552 and associated electric generator (not shown). Some of the steam exhausted from the LP steam turbine 552 is conveyed via line 554 to a condenser 556. The majority of the steam exiting from the turbine 552 is extraction steam used to supply various plant process requirements. For example, line 558 conveys 150 psia process steam to header 560 and this steam is then conveyed via one or more lines 562 to various plant processes. Similarly, line 564 conveys 75 psia process steam to header 566 and this steam is then conveyed to one or more lines 568 to other various plant processes. The remainder of the steam is conveyed via line 554 to the condenser 556. Condensate from condenser 556, as well as from the various plant processes supplied by lines 562 and 568, is conveyed via line 570 to deaerator 572 which, in turn, provides the condensate via line 574 to feedwater pump 536, completing the fluid cycle.

Figure 6:
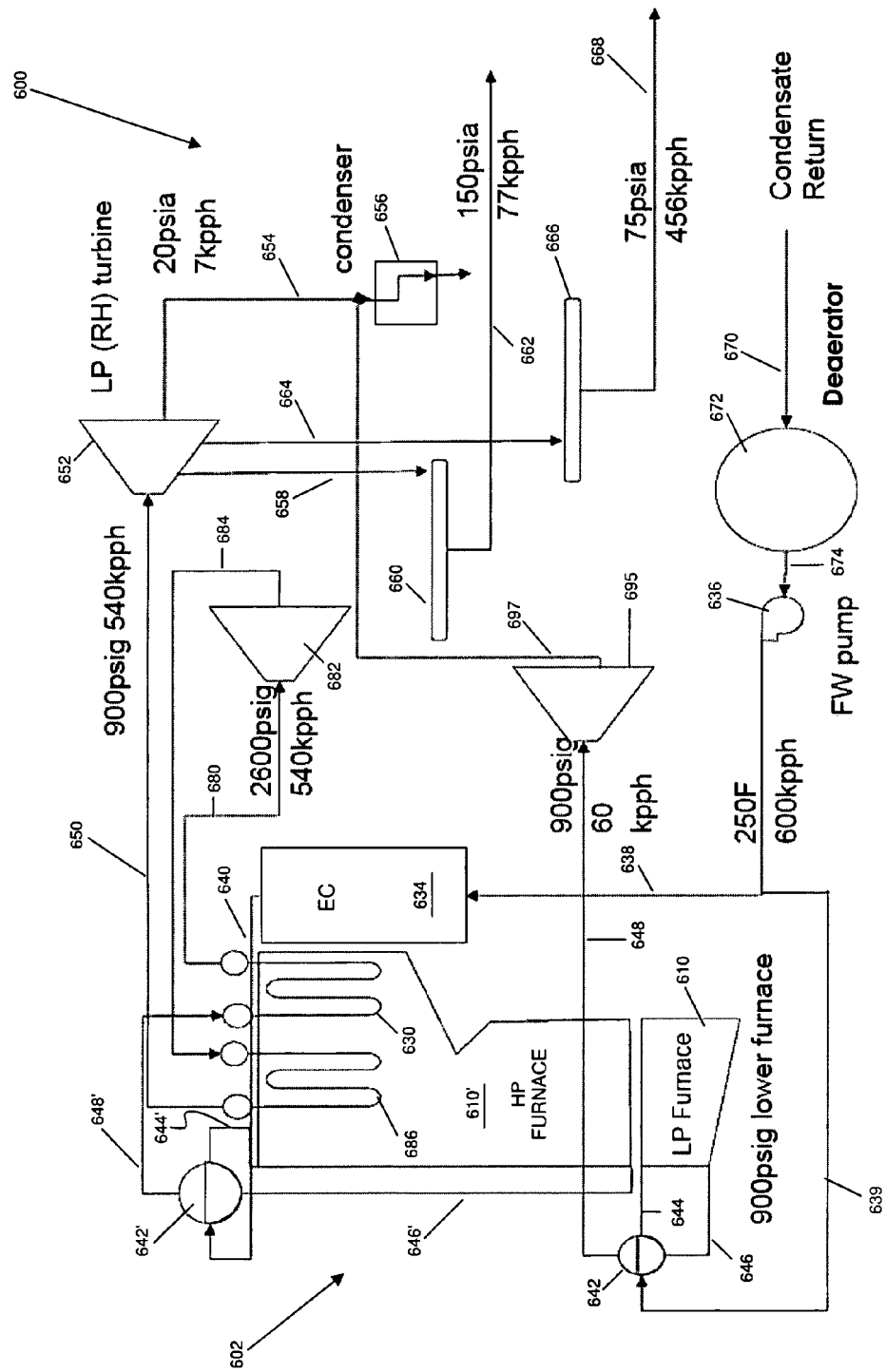
FIG. 6 is a schematic illustration of a fourth embodiment of the present invention, comprising a dual pressure recovery boiler employed as part of a reheat steam cycle steam turbine installation, and wherein low pressure (LP) steam is used to operate a separate steam turbine.

FIG. 6 is a schematic illustration of a fourth embodiment of the present invention, comprising a dual pressure recovery boiler employed as part of a reheat steam cycle steam turbine installation, generally referred to as 600. In this embodiment, low pressure (LP) steam is used to operate a separate steam turbine.

As illustrated therein, recovery boiler 602 comprises a dual pressure furnace having a LP section 610 and a high pressure section 610'. Black liquor combusted within the recovery boiler 602 furnace generates hot gases which flow across the heat transfer surfaces. In this embodiment, RH surface 686 is provided, in addition to high pressure superheater (HPSH) surface 630 and high pressure economizer (HPEC) surface 634.

Feedwater pump 636 provides feedwater to HPEC 634 via line 638 and then via line 640 to the HP steam drum 642', which is part of the HP furnace 610' circuit, and also to the lower LP furnace 610 via line 639. HP steam from the HP steam drum 642' is conveyed via high pressure saturated connections 648' to HPSH 630 via line 680. A HP steam turbine stage 682 is provided and receives the HP steam from HPSH 630. Risers 644 and downcomers 646 fluidically interconnect the LP steam drum 642 and LP furnace 610, while risers 644' and downcomers 646' fluidically interconnect the HP steam drum 642' and HP furnace 610'.

The HP steam from the HPSH 630 is conveyed via line 680 to HP steam turbine 682 and expands through the HP steam turbine 682. The exhaust flow therefrom is conveyed to RH 686 via line 684. In this embodiment, LP steam from the LP steam drum 642 is advantageously conveyed via line 648 and used to supply steam to a separate LP steam turbine 695. The exhaust from LP steam turbine 695 is then conveyed via line 697 to condenser 656.

Reheated steam from RH 686 is conveyed via line 650 from the outlet of RH 686 to the LP steam turbine 652 and associated electric generator (not shown). Some of the steam exhausted from the LP steam turbine 652 is conveyed via line 654 to a condenser 656. The majority of the steam exiting from the turbine 652 is extraction steam used to supply various plant process requirements. For example, line 658 conveys 150 psia process steam to header 660 and this steam is then conveyed via one or more lines 662 to various plant processes. Similarly, line 664 conveys 75 psia process steam to header 666 and this steam is then conveyed to one or more lines 668 to other various plant processes. The remainder of the steam is conveyed via line 654 to the condenser 656. Condensate from condenser 656, as well as from the various plant processes supplied by lines 662 and 668, is conveyed via line 670 to deaerator 672 which, in turn, provides the condensate via line 674 to feedwater pump 636, completing the fluid cycle.

Figure 7:
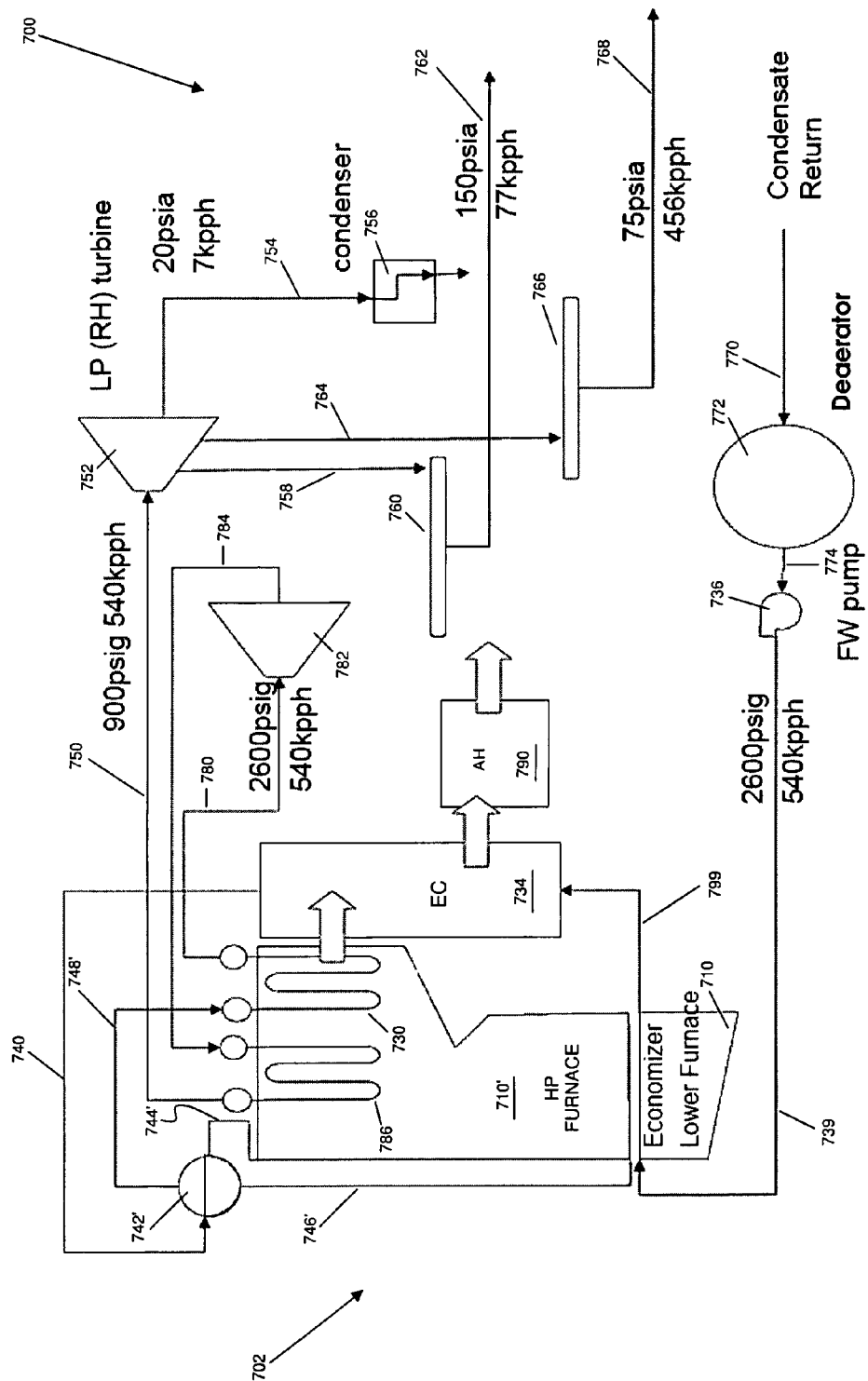
FIG. 7 is a schematic illustration of a fifth embodiment of the present invention, comprising a dual pressure recovery boiler employed as part of a reheat steam cycle steam turbine installation, and wherein the lower furnace portion of the dual pressure recovery boiler comprises a part of the economizer (EC) circuitry.
Figure 8:
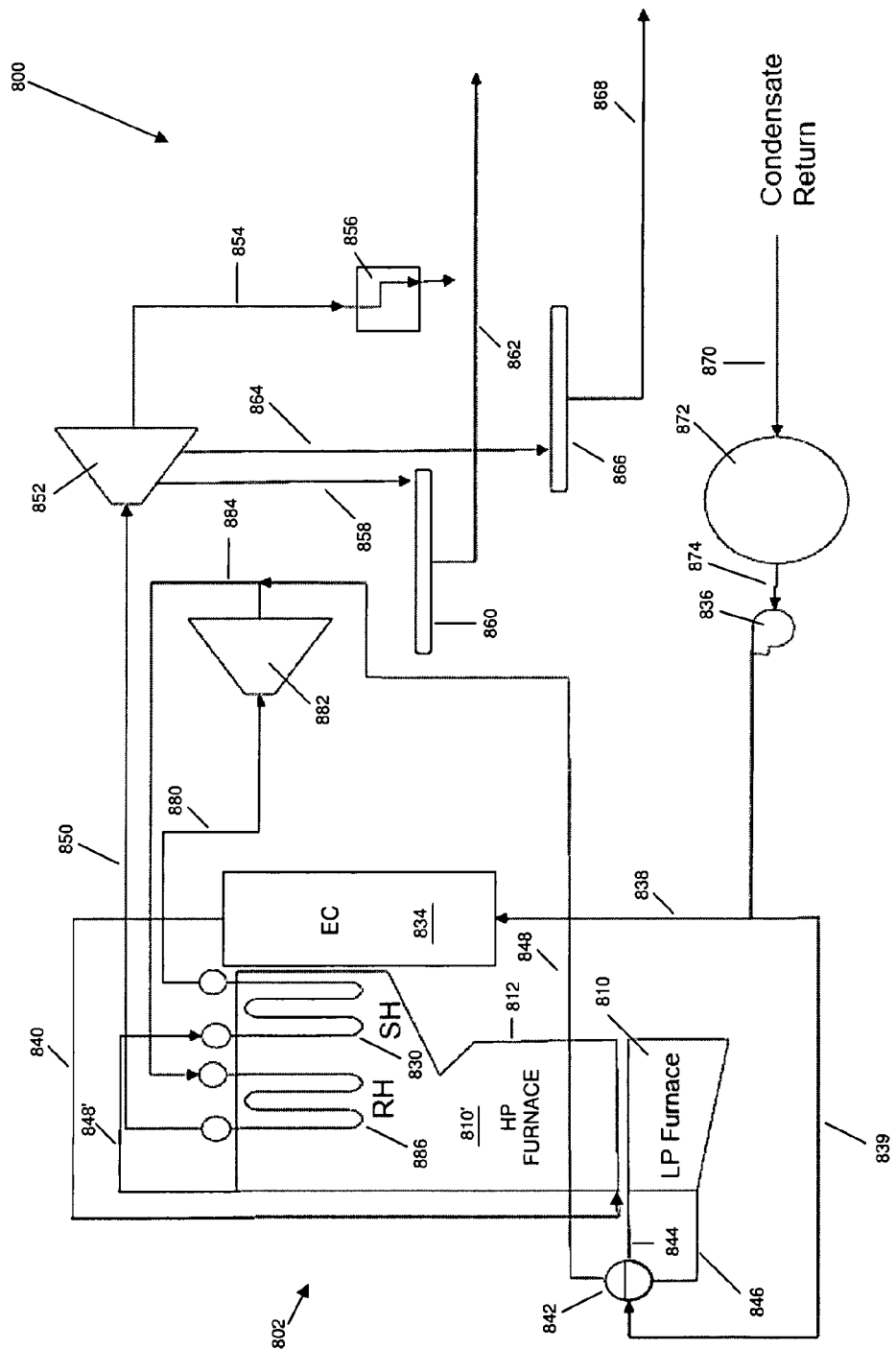
FIG. 8 is a schematic illustration of a sixth embodiment of the present invention, comprising a dual pressure recovery boiler employed as part of a reheat steam cycle steam turbine installation, wherein the top furnace is a once-through supercritical furnace and wherein low pressure (LP) steam is mixed with high pressure (HP) steam turbine exhaust and then reheated.
Figure 9:
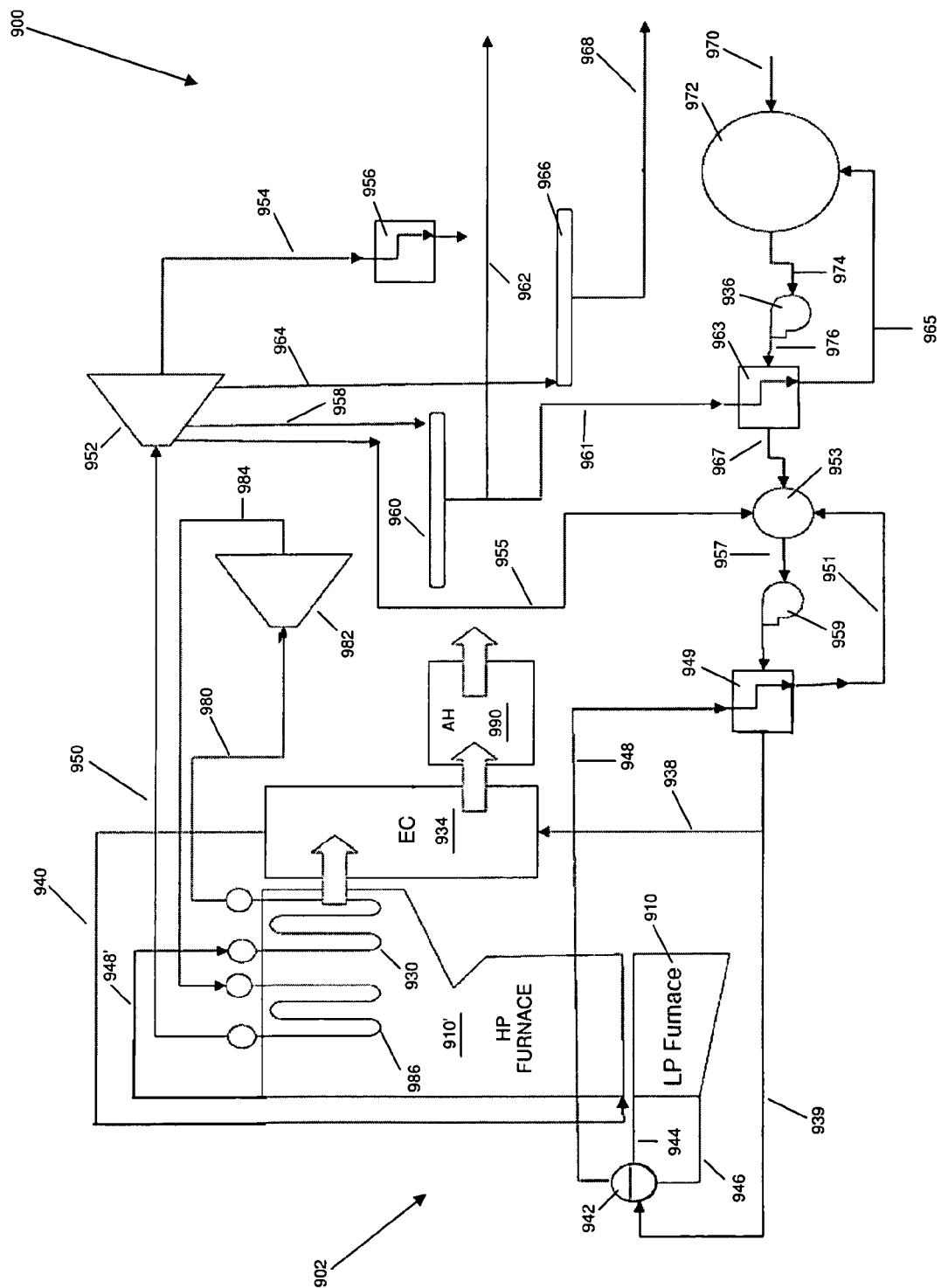
FIG. 9 is a schematic illustration of a seventh embodiment of the present invention, comprising a dual pressure recovery boiler employed as part of a reheat steam cycle steam turbine installation, wherein the top furnace is a once-through supercritical furnace and wherein low pressure (LP) steam is used for feed water heating.
Figure 10:
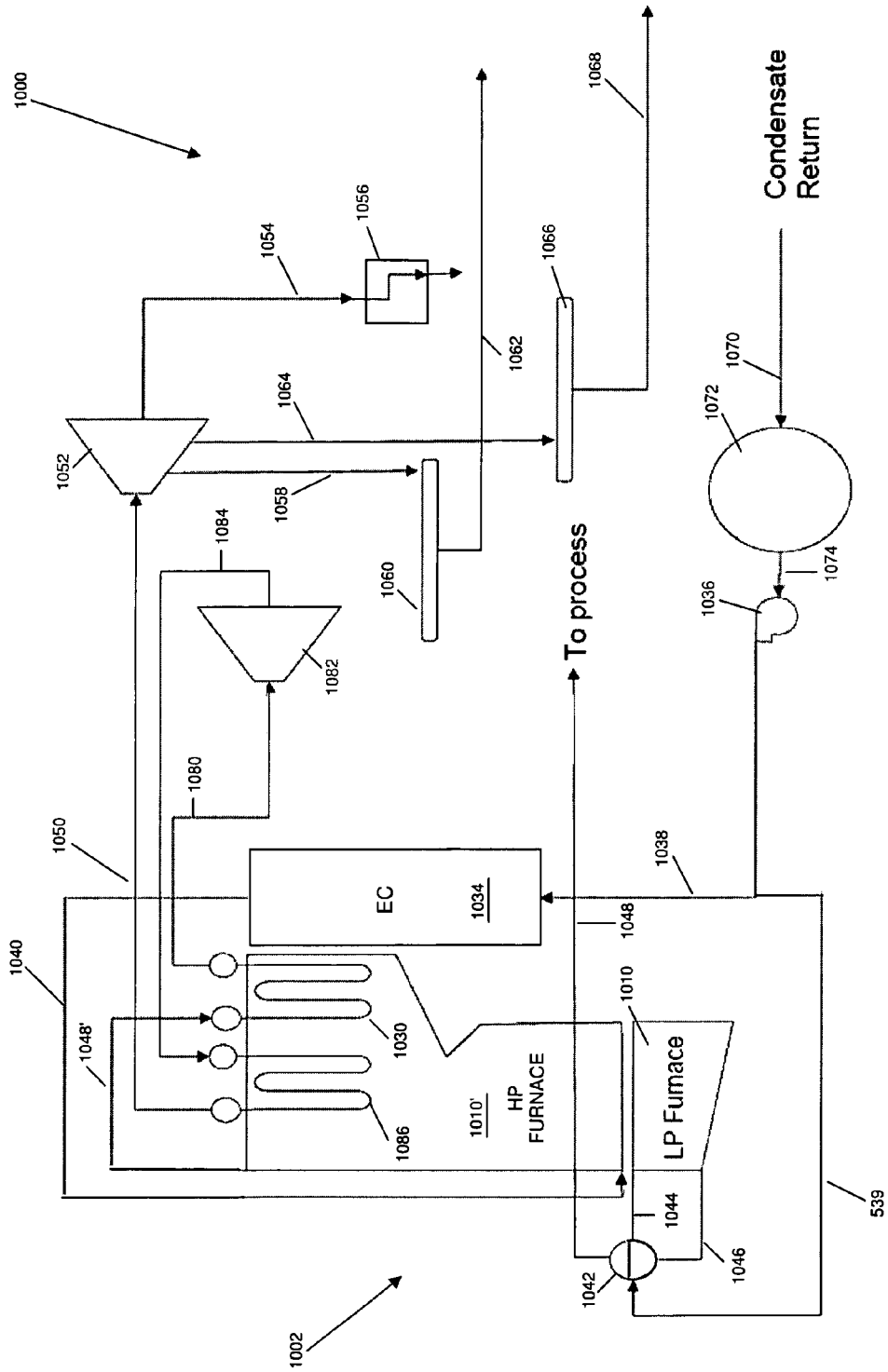
FIG. 10 is a schematic illustration of a eighth embodiment of the present invention, comprising a dual pressure recovery boiler employed as part of a reheat steam cycle steam turbine installation, wherein the top furnace is a once-through supercritical furnace and wherein low pressure (LP) steam is used for process steam.
Figure 11:
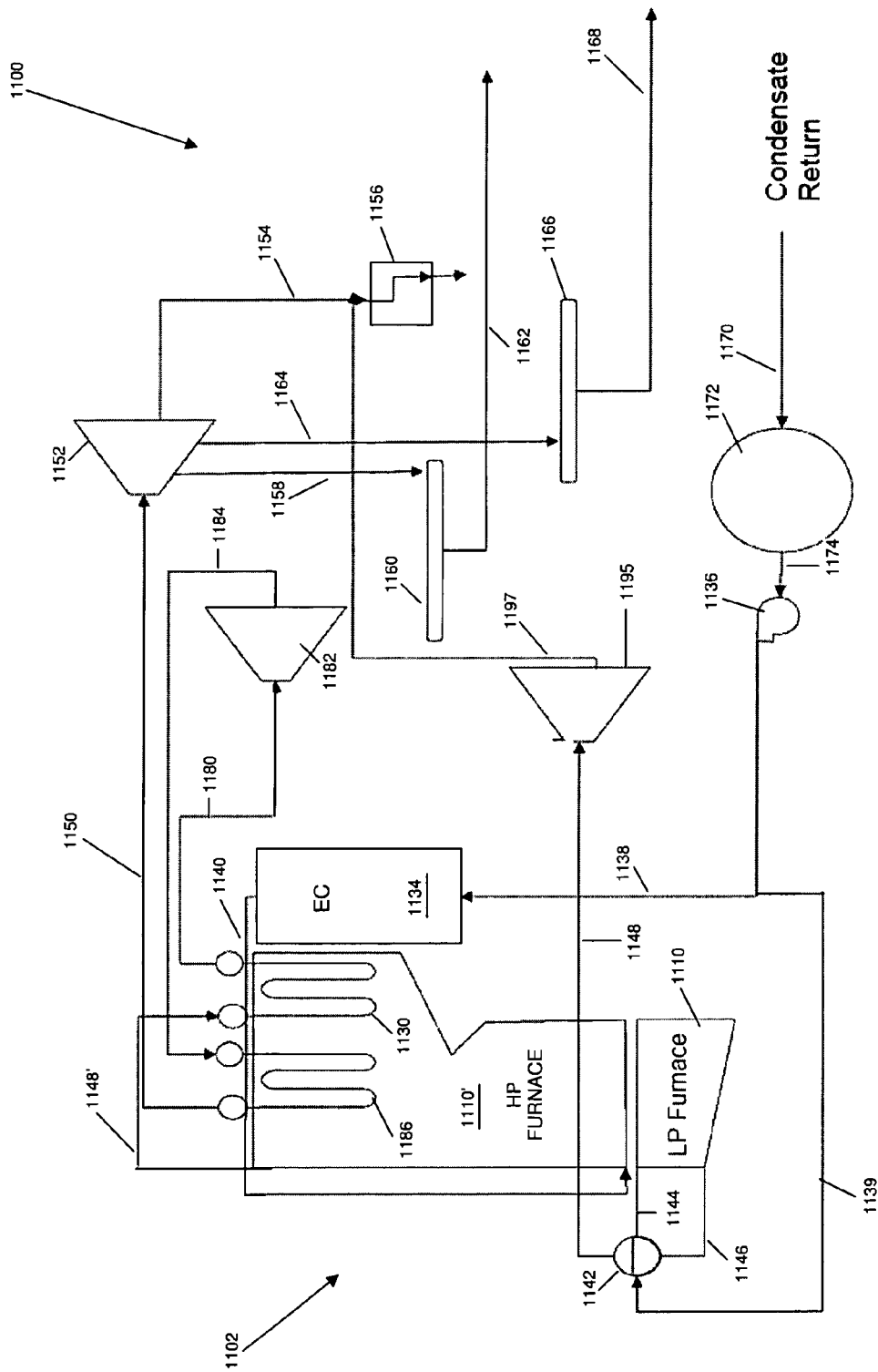
FIG. 11 is a schematic illustration of a ninth embodiment of the present invention, comprising a dual pressure recovery boiler employed as part of a reheat steam cycle steam turbine installation, wherein the top furnace is a once-through supercritical furnace and wherein low pressure (LP) steam is used to operate a separate steam turbine.
Figure 12:
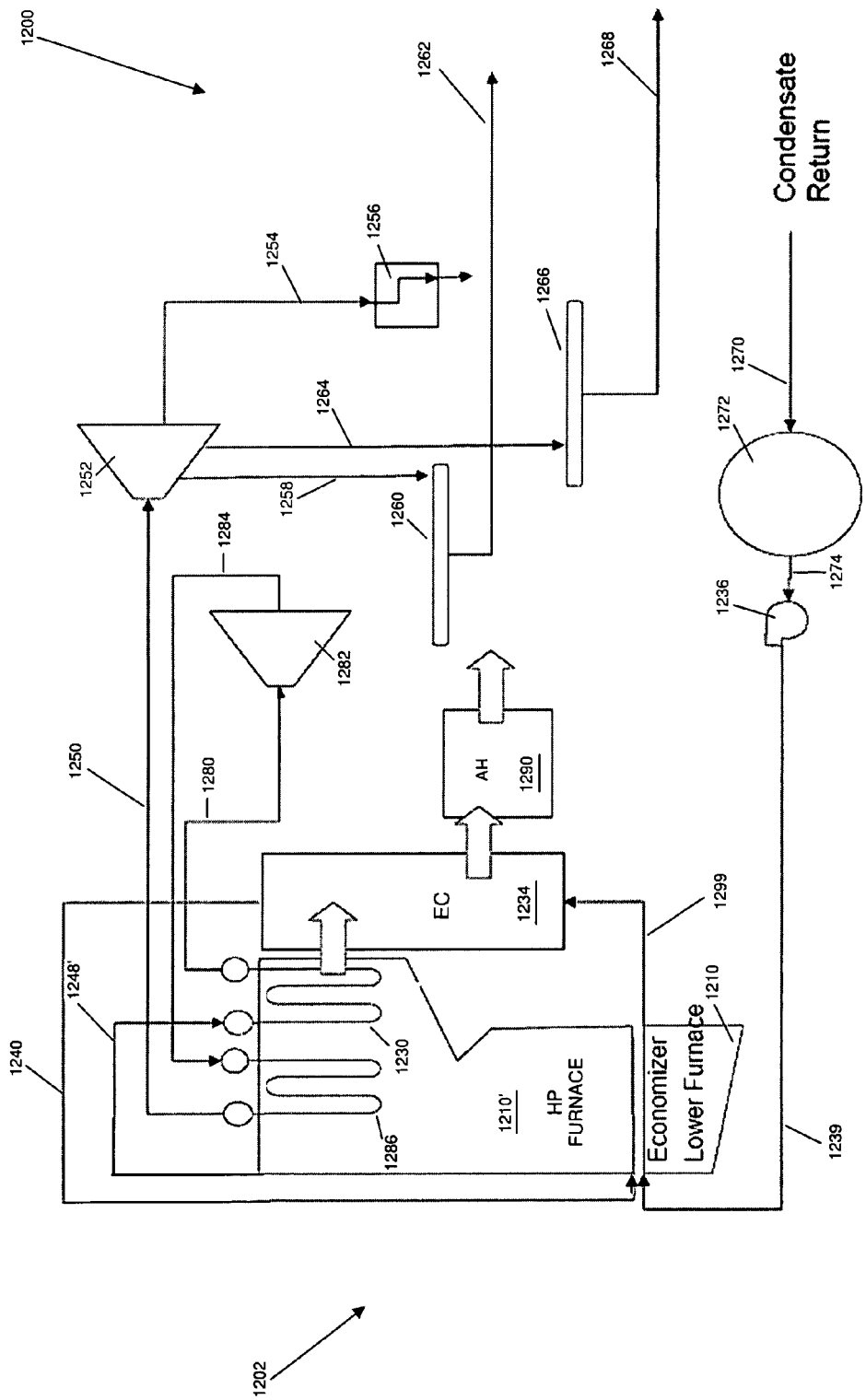
FIG. 12 is a schematic illustration of a tenth embodiment of the present invention, comprising a dual pressure recovery boiler employed as part of a reheat steam cycle steam turbine installation, wherein the top furnace is a once-through supercritical furnace and wherein the lower furnace portion of the dual pressure recovery boiler comprises a part of the economizer (EC) circuitry.

FIG. 7 is a schematic illustration of a fifth embodiment of the present invention, comprising a dual pressure recovery boiler employed as part of a reheat steam cycle steam turbine installation, generally referred to as 700. This embodiment illustrates a modification of the construction of the lower furnace, wherein the lower furnace portion of the dual pressure recovery boiler comprises a part of the economizer (EC) circuitry.

As illustrated therein, recovery boiler 702 comprises a dual pressure furnace having a lower furnace section 710 and a high pressure section 710'. Black liquor combusted within the recovery boiler 702 furnace generates hot gases which flow across the heat transfer surfaces. In this embodiment, RH surface 786 is provided, in addition to high pressure superheater (HPSH) surface 730 and high pressure economizer (HPEC) surface 734. In contrast to the earlier embodiments, the lower furnace section 710 is not boiler (steam generating) surface but rather heating surface which is fluidically connected and upstream of the EC 734. The heated feedwater from the lower furnace section 710 is conveyed via line 799 to the EC 734. Since the working fluid is feedwater, rather than a water-steam mixture, the pressures in this circuit no longer need to be reduced since saturation temperatures are no longer the governing condition for tube wall metal temperatures. Thus the term low pressure is not used in connection with this embodiment where the lower furnace 710 is comprised of economizer heating surface.

tageously a tubular air heater 790, may again be employed to extract additional heat from the flue gases to increase boiler efficiency.

As illustrated in TABLE 1, these design alternatives significantly improve steam cycle efficiency over a conventional recovery boiler steam cycle (FIG. 2, above) allowing the pulp mill to generate up to 20% more electrical output over state of the art conventional cycles.

TABLE 1

| Parameter | Reheat (RH) Cycle with 800 Psig Lower Furnace and 925 F. Superheat (SH) and RH Outlet Temperature | State of the Art SH Cycle |
|---|---|---|
| SH Pressure (psig) | 2600 psig | 1550 psig |
| SH Temperature (Degrees F.) | 925 F. | 925 F. |
| RH Pressure (psig) | 800 psig | Not Applicable |
| RH Temperature (Degrees F.) | 925 F. | Not Applicable |
| Black Liquor Solids (BLS) Throughput @ 6000 Btu/LB BLS | $6.9 \times 10^6$ BLS/day | $6.9 \times 10^6$ BLS/day |
| Heat Input to Boiler @ 75% solids and 70% boiler efficiency (BTU/hr) | $1748 \times 10^6$ Btu/hr | $1748 \times 10^6$ Btu/hr |
| Heat Input (Steam) (Btu/hr) | $1224 \times 10^6$ Btu/hr | $1224 \times 10^6$ Btu/hr |
| SH Steam Flow (Lb/hr) | 1,034,000 Lb/hr | 1,000,000 Lb/hr |
| Lower Furnace Steam Flow to High Pressure Feed Water Heater (HPFWH) (Lb/hr) | 114,900 Lb/hr | Not Applicable |
| Cycle Efficiency (%) | 26.7% | 23.5% |
| Change Relative to State of the Art SH Cycle | 1.14 | 1.00 (Base) |
| Electric Power Generated Megawatt (MW) | 95.6 MW | 84.0 MW |

Feedwater pump 736 provides feedwater via line 739 to the lower furnace section 710, and then to HPEC 734. Line 740 conveys the heated feedwater to HP steam drum 742'. HP steam from the HP steam drum 742' is conveyed via high pressure saturated connections 748' to HPSH 730 via line 780. A HP steam turbine stage 782 is provided and receives the HP steam from HPSH 730. Risers 744' and downcomers 746' fluidically interconnect the HP steam drum 742' and HP furnace 710'.

The HP steam from the HPSH 730 is conveyed via line 780 to HP steam turbine 782 and expands through the HP steam turbine 782. The exhaust flow therefrom is conveyed to RH 786 via line 784. Reheated steam from RH 786 is conveyed via line 750 from the outlet of RH 786 to the LP steam turbine 752 and associated electric generator (not shown). Some of the steam exhausted from the LP steam turbine 752 is conveyed via line 754 to a condenser 756. The majority of the steam exiting from the turbine 752 is extraction steam used to supply various plant process requirements. For example, line 758 conveys 150 psia process steam to header 760 and this steam is then conveyed via one or more lines 762 to various plant processes. Similarly, line 764 conveys 75 psia process steam to header 766 and this steam is then conveyed to one or more lines 768 to other various plant processes. The remainder of the steam is conveyed via line 754 to the condenser 756. Condensate from condenser 756, as well as from the various plant processes supplied by lines 762 and 768, is conveyed via line 770 to deaerator 772 which, in turn, provides the condensate via line 774 to feedwater pump 736, completing the fluid cycle.

Due to the increased feedwater temperature to the EC 734, the flue gases exiting from the recovery boiler 702 may be higher than desired. In such cases, an air heater 790, advan- FIGS. 8-12 are similar to FIGS. 3-7, respectively. The fundamental difference is that FIGS. 8-12 illustrate the application of the principles of the present invention where the HP top furnace is a once-through or supercritical furnace. Accordingly, water-steam separating equipment such as steam drums or vertical separators, as well as downcomers, are not required during normal operation (however, vertical separators (not shown) are typically supplied and used during start-up and low load operation). The heated feedwater from the outlet of the economizer is thus conveyed via a line to the bottom of the HP top furnace. The feedwater is heated in the furnace walls as before, but due to the higher operating pressure in the supercritical range, i.e., in excess of 3206 psia, there is never any distinct water-steam interface. The feedwater provided to the inlet of the HP furnace eventually becomes steam at the furnace outlet which is conveyed to the HP SH as before for superheating and then conveyed via a line to the HP turbine. The HP steam turbine may advantageously be a 3600 psig turbine cycle design, or higher if desired. The operating pressure in the top furnace operating pressure is thus selected to be able to provide steam at a desired steam turbine throttle inlet condition, say 3600 psig, plus the pressure drop in the steam piping, superheater, furnace walls and economizer and feedwater inlet piping back to the feed water pump(s).

There are other advantages that can be achieved via use of the present invention. For example, the present invention provides flexibility if future capacity increases are desired. The lower furnace metallurgy requirements result in lower repair and maintenance costs. The present invention allows the re-use of the existing steam turbine in the pulp mill, while providing additional process steam options and improved boiler efficiency.

While the principles of the present invention may be particularly applicable to pulp and paper mill installations which employ recovery boilers of the Kraft recovery boiler type, it will be appreciated that the present invention is also applicable to soda process recovery boilers, and to other types of industrial boilers. The ability to "decouple" the operating characteristics of the lower furnace portion of such boilers from the upper furnace portion provides increased operating efficiency. Accordingly, while specific embodiments of the present invention have been shown and described in detail to illustrate the application and principles of the invention, it will be understood that it is not intended that the present invention be limited thereto and that the invention may be embodied otherwise without departing from such principles. For example, the present invention may be applied to new construction involving recovery or industrial boilers, or to the replacement, repair or modification of existing recovery or industrial boilers. In some embodiments of the invention, certain features of the invention may sometimes be used to advantage without a corresponding use of the other features. Accordingly, all such changes and embodiments properly fall within the scope of the following claims.

We claim:

1. A dual pressure boiler and steam turbine system comprising:
    a top furnace for producing high pressure steam, a high pressure superheater fluidically connected to the top furnace for superheating the high pressure steam, and a high pressure steam turbine for receiving steam from the superheater and producing a flow of exhaust steam;
    a bottom furnace comprising a low pressure natural circulation steam generating system for producing low pressure steam;
    a first feedwater heater for preheating feedwater with the low pressure steam from the bottom furnace;
    a reheater for reheating the flow of exhaust steam from the high pressure steam turbine;
    a low pressure steam turbine for receiving the reheated steam and producing extraction steam; and
    a second feedwater heater for preheating the feedwater with the extraction steam from the low pressure steam turbine.

2. The dual pressure boiler and steam turbine system according to claim 1, wherein the top furnace comprises a high pressure natural circulation steam generating system.

3. The dual pressure boiler and steam turbine system according to claim 1, wherein the top furnace comprises a high pressure once-through supercritical steam generating system.

4. The dual pressure boiler and steam turbine system according to claim 2, comprising: a high pressure water-steam separator fluidically connected to the top furnace for producing the high pressure steam.

5. The dual pressure boiler and steam turbine system according to claim 1, wherein the low pressure steam turbine is a condensing steam turbine.

6. The dual pressure boiler and steam turbine system according to claim 1, wherein the high pressure steam turbine is a non-condensing steam turbine.

7. The dual pressure boiler and steam turbine system according to claim 1, wherein the high pressure steam turbine is configured as one of the following: a steam turbine separate from the low pressure steam turbine; an additional stage provided upstream of the low pressure steam turbine; and a high pressure steam turbine coupled to a low pressure steam turbine-generator.

8. The dual pressure boiler and steam turbine system according to claim 1, comprising at least one feedwater pump for providing feedwater to at least one of the top and bottom furnaces.

9. The dual pressure boiler and steam turbine system according to claim 1, wherein the top furnace is a recovery boiler furnace.

10. The dual pressure boiler and steam turbine system according to claim 1, wherein the bottom furnace is a recovery boiler furnace.

11. The dual pressure boiler and steam turbine system according to claim 1, wherein both the top and bottom furnaces are recovery boiler furnace.

12. A dual pressure boiler and steam turbine system comprising:
    a top furnace for producing high pressure steam, a high pressure superheater fluidically connected to the top furnace for superheating the high pressure steam, and a high pressure steam turbine for receiving steam from the superheater and producing a flow of exhaust steam;
    economizer convection heating surface fluidically connected to provide heated feedwater to the top furnace;
    a bottom furnace comprising economizer fluidically connected to provide heated feedwater to the economizer convection heating surface;
    a feedwater pump for providing feedwater to the bottom furnace;
    a reheater for reheating the flow of exhaust steam from the high pressure steam turbine; and
    a low pressure steam turbine for receiving the reheated steam.

13. The dual pressure boiler and steam turbine system according to claim 12, wherein the top furnace comprises a high pressure natural circulation steam generating system.

14. The dual pressure boiler and steam turbine system according to claim 12, wherein the top furnace comprises a high pressure once-through supercritical steam generating system.

15. The dual pressure boiler and steam turbine system according to claim 12, wherein the top furnace is a recovery boiler furnace.

16. The dual pressure boiler and steam turbine system according to claim 12, wherein the bottom furnace is a recovery boiler furnace.

17. The dual pressure boiler and steam turbine system according to claim 12, wherein both the top and bottom furnaces are recovery boiler furnace.

18. A dual pressure boiler and steam turbine system comprising:
    a top furnace for producing high pressure steam, a high pressure superheater fluidically connected to the top furnace for superheating the high pressure steam, and a high pressure steam turbine for receiving steam from the superheater and producing a flow of exhaust steam;
    a bottom furnace comprising a low pressure natural circulation steam generating system for producing low pressure steam;
    a reheater for reheating the flow of exhaust steam from the high pressure steam turbine;
    a low pressure steam turbine for receiving the reheated steam;
    a second low pressure steam turbine for receiving the low pressure steam from the bottom furnace; and
    a condenser for receiving the exhaust steam from at least one of the low pressure steam turbine and the second low pressure steam turbine.

19. The dual pressure boiler and steam turbine system according to claim 18, wherein the top furnace comprises a high pressure natural circulation steam generating system.

20. The dual pressure boiler and steam turbine system according to claim 18, wherein the top furnace comprises a high pressure once-through supercritical steam generating system.

21. The dual pressure boiler and steam turbine system according to claim 19, comprising: a high pressure water-steam separator fluidically connected to the top furnace for producing the high pressure steam.

22. The dual pressure boiler and steam turbine system according to claim 18, wherein the low pressure steam turbine is a condensing steam turbine.

23. The dual pressure boiler and steam turbine system according to claim 18, wherein the high pressure steam turbine is a non-condensing steam turbine.

24. The dual pressure boiler and steam turbine system according to claim 18, wherein the high pressure steam turbine is configured as one of the following: a steam turbine separate from the low pressure steam turbine; an additional stage provided upstream of the low pressure steam turbine; and a high pressure steam turbine coupled to a low pressure steam turbine-generator.

25. The dual pressure boiler and steam turbine system according to claim 18, comprising at least one feedwater pump for providing feedwater to at least one of the top and bottom furnaces.

26. The dual pressure boiler and steam turbine system according to claim 18, comprising a feedwater heater for preheating the feedwater with the low pressure steam from the bottom furnace.

27. The dual pressure boiler and steam turbine system according to claim 26, wherein the low pressure steam turbine produces extraction steam and further comprising a feedwater heater for preheating the feedwater with the extraction steam from the low pressure steam turbine.

28. The dual pressure boiler and steam turbine system according to claim 18, wherein the top furnace is a recovery boiler furnace.

29. The dual pressure boiler and steam turbine system according to claim 18, wherein the bottom furnace is a recovery boiler furnace.

30. The dual pressure boiler and steam turbine system according to claim 18, wherein both the top and bottom furnaces are recovery boiler furnace.

* * * * *